Dec. 15, 1964     L. E. MARKEL     3,161,433
CAMPING TRAILER

Filed Feb. 4, 1963     4 Sheets-Sheet 1

INVENTOR.
LEE E. MARKEL
BY Hobbs & Caston
ATTORNEYS

Dec. 15, 1964     L. E. MARKEL     3,161,433
CAMPING TRAILER

Filed Feb. 4, 1963     4 Sheets-Sheet 2

INVENTOR.
LEE E. MARKEL
BY *Hobbs & Easton*
ATTORNEYS

Dec. 15, 1964     L. E. MARKEL     3,161,433
CAMPING TRAILER

Filed Feb. 4, 1963     4 Sheets-Sheet 3

INVENTOR.
LEE E. MARKEL
BY *Hobbs & Easton*

ATTORNEYS

United States Patent Office 3,161,433
Patented Dec. 15, 1964

3,161,433
CAMPING TRAILER
Lee E. Markel, Bristol, Ind., assignor to Skamper Corporation, Bristol, Ind., a corporation of Indiana
Filed Feb. 4, 1963, Ser. No. 255,988
2 Claims. (Cl. 296—27)

The present invention relates to a trailer and more particular to a collapsible trailer constructed and designed primarily for use as a camping trailer.

A large number of camping trailers have been designed and placed on the market, which are adapted to contract or collapse into a relatively compact unit for towing behind an automobile or similar vehicle and to expand into sleeping and living quarters for overnight stops and between trips. These prior trailers have had a number of inherent disadvantages, including difficulty in expanding into a structure suitable for living quarters and contracting or collapsing into a compact unit suitable for easy towing and handling on the road and for hauling camping equipment, sporting gear and the like. Further, the mechanism for expanding and contracting the trailer has often been complicated, heavy and difficult to manipulate to shift the trailer between is contracted and expanded positions, or has been bulky, requiring much needed space within the trailer compartment for the mechanism and interfering with otherwise full utilization of the space, either for living quarters or for hauling camping equipment and the like. It is therefore one of the principal objects of the present invention to provide a camping trailer or the like which can be easily and readily expanded from a relatively low and compact unit for towing the trailer into a full size unit suitable for comfortable living quarters, and which employs a relatively simple, easily manipulated mechanism for shifting the trailer between the contracted and expanded positions and for safely retaining the trailer in its expanded position until it is intentionally contracted or collapsed.

Another object of the invention is to provide a mechanism for expanding and collapsing or contracting the roof and side walls of a camping trailer or the like, which contains only a few simple moving parts placed externally of the trailer compartment where they can be easily reached to operate in expanding and contracting the trailer, and easily manipulated by a single operator to readily perform the complete expanding and contracting operation.

Still another object of the invention is to provide a trailer having rigid side walls extending upwardly approximately one third of the trailer body height and a rigid roof adapted to be raised from traveling position on and in engagement with the upper edge of the side walls to a position sufficiently above the trailer bed to form full size living quarters, wherein the roof is supported only by four corner rod-like posts which can be folded or collapsed downwardly when the roof is lowered, to a compact position along opposite sides of the trailer.

A further object is to provide a foldable trailer having an elevatable top supported by four rod-like supports located at the corners of the trailer body and slidable from the top supporting position to the folded position along the external side of the body without increasing the overall width of the trailer.

Another object of the invention is to provide a trailer of the aforesaid type which can be easily fabricated and assembled using in most instances standard materials readily available on the market and which can be conveniently and readily serviced and repaired.

Additional objects and advantages of the present invention will become apparent from the following description and accompanying drawings, wherein.

Figure 1:
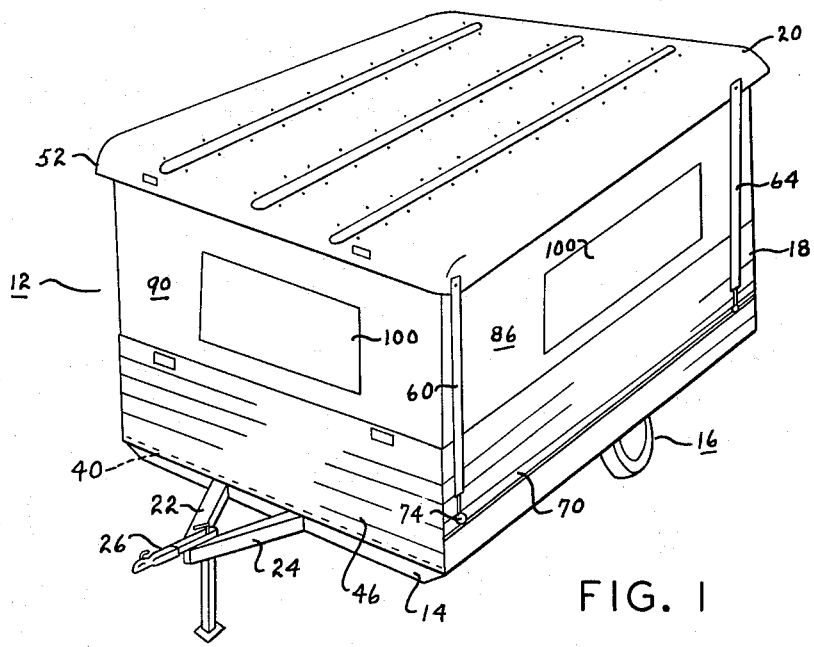
FIGURE 1 is a perspective view of the present collapsible camping trailer showing the trailer in its expanded condition.

Referring more specifically to the drawings, numeral 12 designates generally the present trailer having a frame 14, undercarriage 16, bed 18, top or roof 20, frame extension members 22 and 24 joined together at their forward end and supporting a trailer hitch 26 for connection with an automobile or other vehicle for towing the trailer. The undercarriage 16 is of the two-wheel type connected to and supporting the frame 14 by springs 28 and 30 connected to each end of the axle 32. The specific structure of the undercarriage, frame and hitch does not form a direct part of the present invention and hence will not be described in detail herein. The present type of trailer is designed primarily for use on camping trips and the like which often require a substantial amount of equipment and on which the camper travels most of the day and hastily prepares the trailer for occupancy at night. It is therefore important to provide a trailer which can be easily maneuvered, often over proor highways in rough country, and over superhighways at high speed. The present trailer satisfies all of these conditions, including low center of gravity for maneuverability and high speed, and adequate space for sleeping quarters and camping equipment and gear. The bed 18 may be devoid of any permanent fixtures or furniture, or it may contain essentials for complete living, including heater, stove, bed, table and chairs. These may be varied from one trailer to another to satisfy requirements.

The bed 18 consists of a floor 40, two sides walls 42, front end wall 46 and rear end wall 48. The two side walls and front wall are solid panels and the rear wall preferably contains a door 50 hinged to panel section 48a and locked into engagement with panel section 48b. The side, front and rear panels may be of any suitable construction; normally, however, they consist of plywood construction covered by sheet metal such as sheet aluminum. The top or roof 20 is preferably formed of metal reinforced by a suitable frame structure and plywood and having rolled edges 52 for seating over the upper edge of the side and end walls when the top is in its retracted or lowered position illustrated in FIGURE 2. This construction forms an effective seal to prevent rain, road slush and the like from entering the compartment when the trailer is being towed. Two fixtures or latches 54 and 56 connected to the front edge of top 20 and releasably connected to front panel 46, and similar fixtures connecting the rear edge of the top and the rear panel are provided to secure the top to the trailer for traveling when the trailer is in its contracted condition. The top is sufficiently rigid and light in weight to permit it to be lifted and handled without any substantial distortion or deflection.

Figure 2:
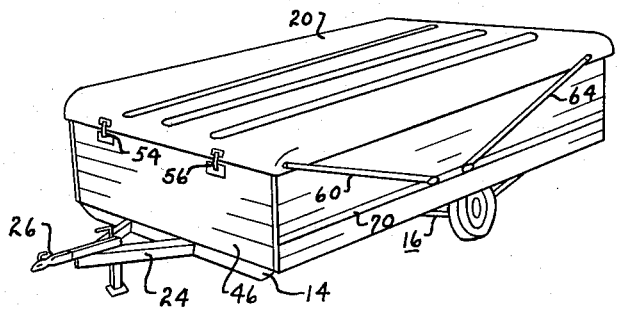
FIGURE 2 is a perspective view of the trailer shown in FIGURE 1 illustrating the trailer in its contracted position.
Figure 5:
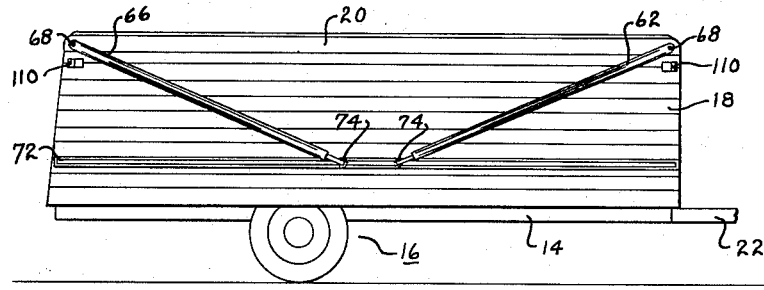
FIGURE 5 is a side elevational view of the trailer shown in the preceding figures, showing the trailer in its contracted position.

The top is supported in its raised position by two posts 60 and 62 at the front corners of the trailer and two posts 64 and 66 at the rear corners of the trailer. These posts are preferably of tubular or rod material, the upper ends of which are pivotally connected by rivets 68 to the sides of the top near the front and rear edges thereof, and the lower ends of the posts are inserted in tracks 70 and 72 along opposite sides of the trailer body. The lower ends of the rods are provided with rollers 74 which travel on the respective tracks 70 and 72. It is seen that when the top is in its lowered position, as illustrated in FIGURES 2 and 5, the rollers 74 are positioned near the center of the respective tracks 70 and 72 and, when the top is in its elevated position, the rollers are adjacent opposite ends of the respective tracks. The tracks are of channel-like construction with the open side thereof facing outwardly and with two flanges 80 and 82 for retaining the rollers in the tracks, the rollers being connected to the lower end of the respective rod by pin 84. The space between the upper edges of the rigid sides and end panels and the lower edge of the top is enclosed by flexible panels 86 and 88 on opposite sides and panels 90 and 92 at the front and rear. These panels are preferably firmly secured to the upper edges of panels 42, 46 and 48, and to the lower edge 94 of the roof 20 by strips 96 and 98 secured by screws 99 or other suitable means to the respective edges. The material used in the construction of these flexible panels may be waterproof fabric, such as canvas, or any suitable plastic material, and these panels may be provided with windows, such as illustrated at numeral 100, over which easily folded mesh or transparent plastic material may be placed. The panel above the rear door preferably contains one or more slits with zippers 102, or the like, thereby permitting the occupants to conveniently enter and leave the trailer through door 50.

Figure 3:
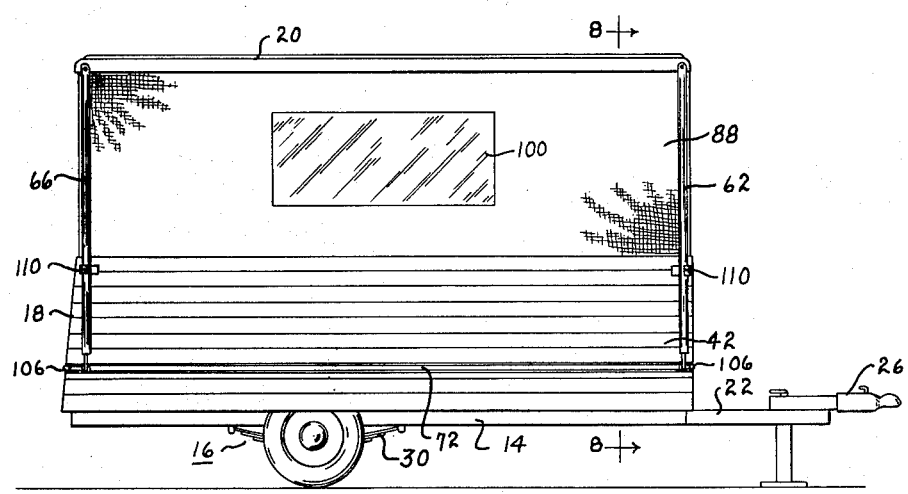
FIGURE 3 is a side elevational view of the trailer shown in the preceding figures, showing the trailer in its expanded condition.
Figure 4:
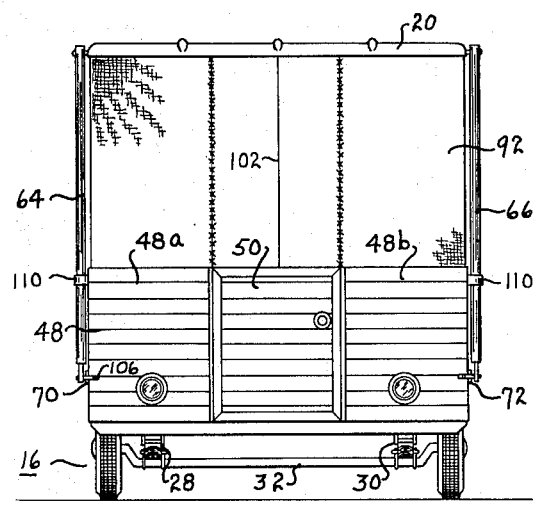
FIGURE 4 is a rear elevational view of the trailer shown in the preceding figures, showing the trailer in its expanded condition.
Figure 6:
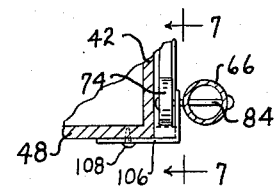
FIGURE 6 is an enlarged fragmentary plan view of a portion of the fixture employed in retaining the trailer in its expanded condition.
Figure 7:
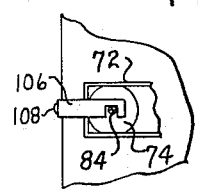
FIGURE 7 is an enlarged fragmentary cross sectional view taken on line 7—7 of FIGURE 6.

In the operation of the present trailer with the trailer in the condition shown in FIGURES 2 and 5, the camper in preparing the trailer for occupancy first releases fixtures 54 and 56 on the front end of the trailer and corresponding fixtures on the rear end thereof and lifts one end of top 20, pulling the posts on the respective end along tracks 70 and 72 until the rollers are at the end of the tracks and the posts are in vertical position. Fixtures 106 pivoted on screws 108 at the respective corners are hooked over pins 84 as illustrated in FIGURES 6 and 7, thus retaining the respective posts in their vertical position at the end of the trailer bed, with the posts seated in inwardly facing U-shaped fixtures 110. The camper then lifts the opposite end of the top, pulling the respective posts toward the end until the rollers reach the ends of the two tracks and then hooking fixture 106 over pins 84 of the respective posts. The trailer is then in condition for occupancy, as illustrated in FIGURES 1, 3 and 4, without anything further being required, since the flexible panels are automatically stretched between the upper edges of the bed and the lower edge of the top. The trailer is folded or collapsed by reversing the foregoing operation, consisting in releasing the rods at one end and lowering one end and then releasing the rods at the other end and lowering that end to the position shown in FIGURES 2 and 5, and then clamping the top in place on the bed with fixtures 54 and 56.

Figure 9:
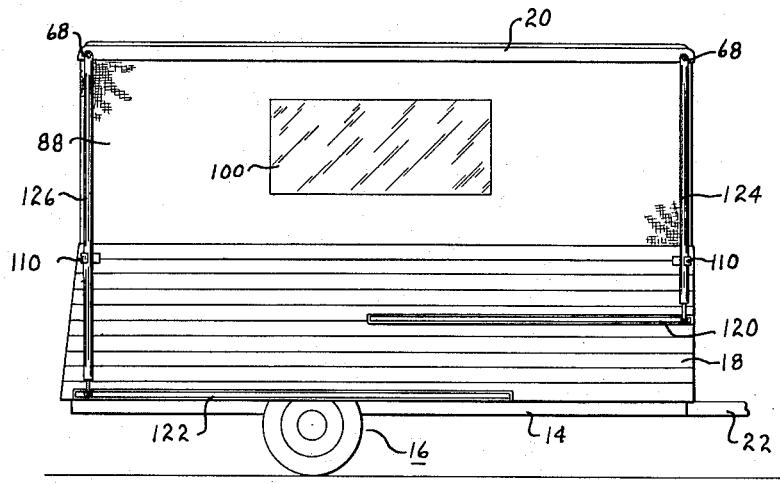
FIGURE 9 is a side elevational view of a modified form of the present expandable and contractible trailer, showing the trailer in its expanded condition.
Figure 10:
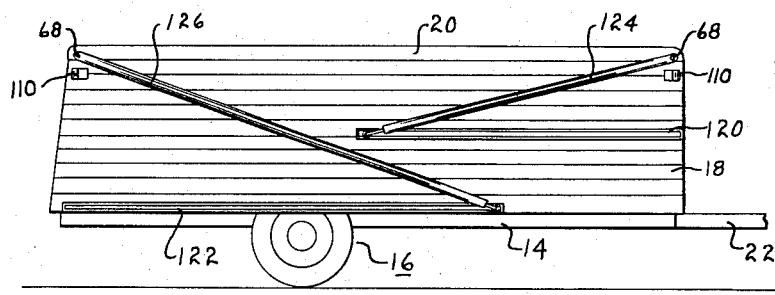
FIGURE 10 is a side elevational view of the modified form of the trailer shown in FIGURE 9, illustrating the trailer in its contracted condition.
Figure 8:
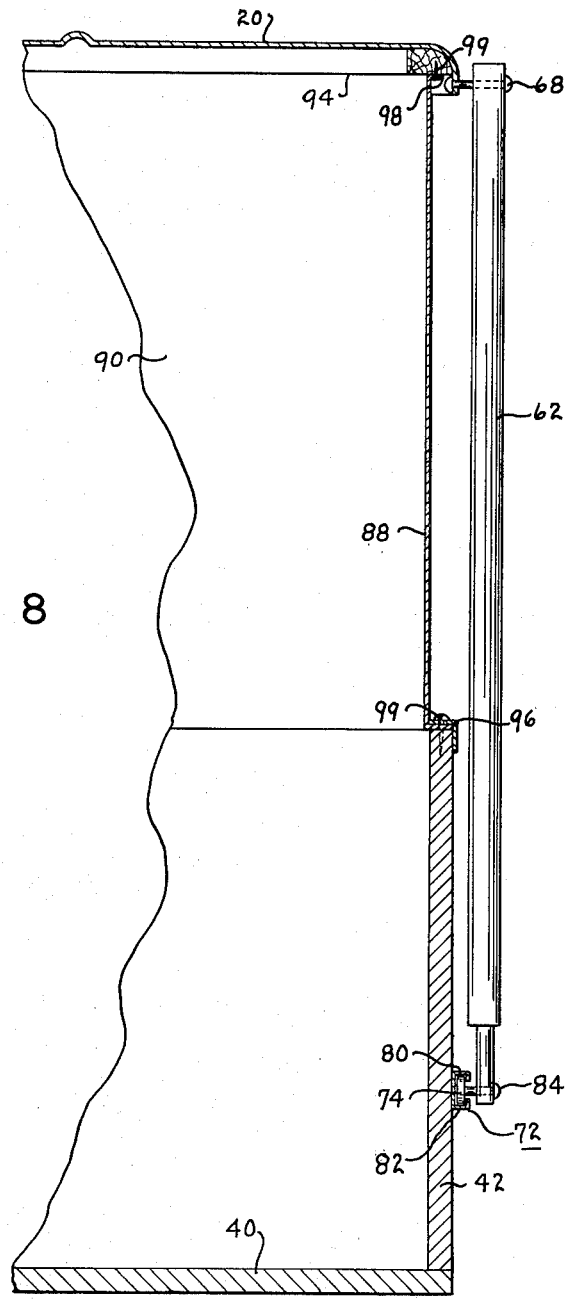
FIGURE 8 is a fragmentary cross sectional view of the trailer showing in greater detail the mechanism for expanding and contracting the trailer, the section being taken on line 8—8 of FIGURE 3.

The modified form of the present invention illustrated in FIGURES 9 and 10 is employed in conjunction with a relatively short trailer bed in which the two rods on one side are too long to operate in one track without interfering with one another. In this form two separate tracks 120 and 122 are used, spaced one above the other on each side, to permit posts 124 and 126 to fold completely down without laterally overlapping one another, as illustrated in FIGURE 9. The posts at one end, at the end having the short tracks on each side, are shorter than the posts at the other end, so that the top will be horizontal when in its fully elevated position. The construction of the remaining parts and the operation of this embodiment are the same as those of the previously described embodiment and hence will not be described in detail herein and like numerals will be used with reference to the modified form.

While only two embodiments of the present invention have been described in detail herein, various changes and further modifications may be made to satisfy requirements. For example, in the first embodiment described herein a reversal of parts may be used, in which the tracks are mounted on the side edges of the top and the posts are pivoted to the bed adjacent the four corners.

I claim:

1. A collapsible camping trailer, comprising a frame, an undercarriage supporting said frame, a bed consisting of two side walls and front and rear end walls supported by said frame, a top of continuous construction adapted to rest on the upper edges of said walls and having an external flange extending over the external upper edges of said walls, four posts pivotally connected at their upper ends to said top along the sides near the corners thereof for supporting said top in an elevated position, a track having upper and lower flanges mounted on each side of said bed for slidably supporting the lower ends of said posts, a U-shaped means mounted on said bed between said track and pivot for supporting each of said posts in vertical position, moveable means on each of said posts disposed between said track flanges, and a holding means mounted at each track end for holding said moveable means at the end of the respective track with the posts in vertical position and for holding said top in its elevated position.

2. In a collapsible camping trailer: the parts consisting of a bed portion with side walls and a top portion with side walls supported above said bed portion, four posts pivotally connected at one end to one of said portions along the sides at the corners thereof for supporting said top portion in an elevated position, said posts being spaced upwardly from the bottom of said bed portion, a track having upper and lower flanges mounted on each side of the other of said portions for slidably supporting the other end of said posts, a U-shaped means mounted on said bed between said track and pivot for supporting each of said posts in vertical position, moveable means on each of said posts disposed between said track flanges, and a holding means mounted at each track end for holding said moveable means at the end of the respective track with the posts in vertical position and for holding said top in its elevated position.

References Cited by the Examiner
UNITED STATES PATENTS 2,729,497   1/56   Runyan _____ 296—23
3,050,331   8/62   Mansen _____ 296—27

A. HARRY LEVY, *Primary Examiner.*